United States Patent
Shiraishi et al.

(10) Patent No.: US 9,268,725 B2
(45) Date of Patent: Feb. 23, 2016

(54) DATA TRANSFERRING APPARATUS AND DATA TRANSFERRING METHOD

(71) Applicant: CANON KABUSHIKI KAISHA, Tokyo (JP)

(72) Inventors: Daisuke Shiraishi, Tokyo (JP); Chuma Nagao, Kunitachi (JP); Akiyoshi Momoi, Bangalore (IN); Takeshi Hiraoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 13/715,746

(22) Filed: Dec. 14, 2012

(65) Prior Publication Data
US 2013/0159574 A1 Jun. 20, 2013

(30) Foreign Application Priority Data

Dec. 20, 2011 (JP) ................................. 2011-278698

(51) Int. Cl.
*G06F 13/36* (2006.01)
*H04L 29/06* (2006.01)
*H04W 28/06* (2009.01)

(52) U.S. Cl.
CPC ................ *G06F 13/36* (2013.01); *H04L 69/22* (2013.01); *H04W 28/06* (2013.01)

(58) Field of Classification Search
CPC ........ H04L 69/04; H04L 69/22; H04W 28/06
USPC .................... 710/107; 370/477, 474; 709/247
See application file for complete search history.

(56) References Cited

U.S. PATENT DOCUMENTS

| | | | | |
|---|---|---|---|---|
| 5,293,379 A * | 3/1994 | Carr | ............................ | 370/474 |
| 6,032,197 A * | 2/2000 | Birdwell et al. | ............... | 709/247 |
| 6,061,366 A * | 5/2000 | Seki et al. | ...................... | 370/477 |
| 6,725,343 B2 * | 4/2004 | Barroso et al. | ................ | 711/145 |
| 6,751,710 B2 * | 6/2004 | Gharachorloo et al. | ....... | 711/141 |
| 6,823,403 B2 * | 11/2004 | Gulick et al. | .................... | 710/22 |
| 6,914,903 B1 * | 7/2005 | Miyazaki et al. | ............. | 370/389 |
| 7,162,546 B2 * | 1/2007 | Creta et al. | ........................ | 710/5 |
| 7,480,303 B1 * | 1/2009 | Ngai | .......................... | 370/395.5 |
| 7,486,700 B2 * | 2/2009 | Miyazaki et al. | ............. | 370/477 |
| 7,583,701 B2 * | 9/2009 | Miyazaki et al. | ............. | 370/477 |
| 8,160,107 B2 * | 4/2012 | Miyazaki et al. | ............. | 370/477 |
| 8,472,479 B2 * | 6/2013 | Miyazaki et al. | ............. | 370/477 |

(Continued)

FOREIGN PATENT DOCUMENTS

JP H10-173659 A 6/1998
JP 2003-338830 A 11/2003

*Primary Examiner* — Glenn A Auve
(74) *Attorney, Agent, or Firm* — Canon U.S.A., Inc. IP Division

(57) ABSTRACT

A data transferring apparatus includes a receiving unit configured to receive a transfer request containing attribute information that indicates a type of data transfer, a buffer configured to store the transfer requests received by the receiving unit, a storing unit configured to associate the attribute information with a first identifier and store the attribute information, and a sending unit configured to preferentially transmit, out of the plurality of transfer requests stored in the buffer, a transfer request containing attribute information that corresponds to the attribute information stored in the storing unit, wherein the sending unit is configured to transmit the first identifier associated with the attribute information that corresponds to the attribute information contained in the transfer request in place of the attribute information of the transfer request.

8 Claims, 10 Drawing Sheets

(56) References Cited

U.S. PATENT DOCUMENTS

| | | | |
|---|---|---|---|
| 8,774,017 B2* | 7/2014 | Miyazaki et al. | 370/252 |
| 8,799,550 B2* | 8/2014 | Luk et al. | 710/314 |
| 2004/0148472 A1* | 7/2004 | Barroso et al. | 711/141 |
| 2006/0274748 A1* | 12/2006 | Nakashima et al. | 370/389 |
| 2011/0149848 A1* | 6/2011 | Ho et al. | 370/328 |

* cited by examiner

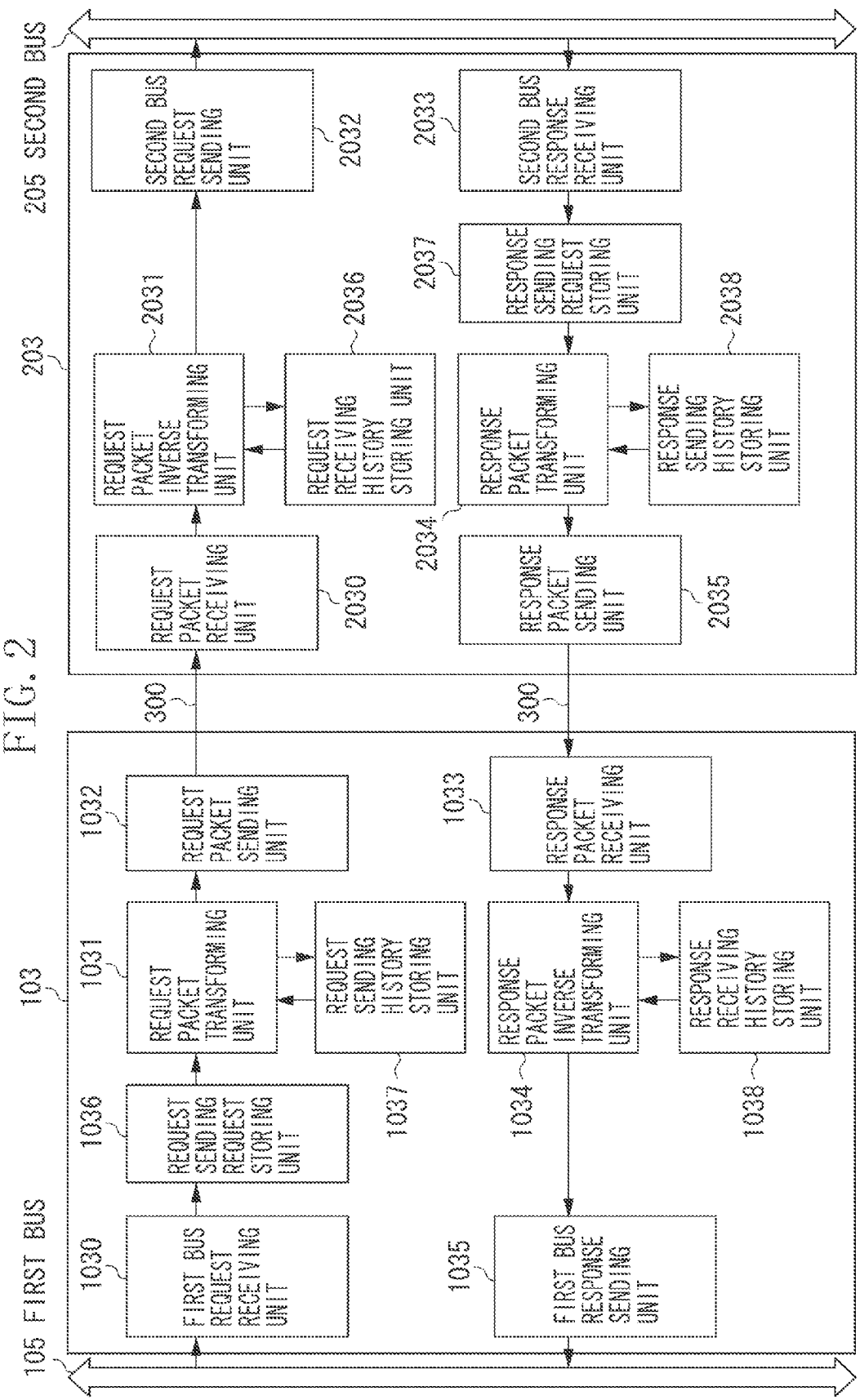

FIG. 4

| Type | DESCRIPTION OF PACKET IDENTIFIER |
|---|---|
| 00000 | Read Request WITH TRANSFER ATTRIBUTE INFORMATION |
| 10000 | Read Request WITHOUT TRANSFER ATTRIBUTE INFORMATION |
| 01000 | Write Request WITH TRANSFER ATTRIBUTE INFORMATION |
| 11000 | Write Request WITHOUT TRANSFER ATTRIBUTE INFORMATION |
| 00100 | Read Response WITH TRANSFER ATTRIBUTE INFORMATION |
| 10100 | Read Response WITHOUT TRANSFER ATTRIBUTE INFORMATION |
| 01100 | Write Response WITH TRANSFER ATTRIBUTE INFORMATION |
| 11100 | Write Response WITHOUT TRANSFER ATTRIBUTE INFORMATION |

FIG. 6A

| A-1 | B-1 | A-2 | B-2 | A-3 | B-3 | A-4 | B-4 |
|---|---|---|---|---|---|---|---|
0   204   408   612   816   1020  1224  1428  1632

FIG. 6B

| A-1 | A-2 | A-3 | A-4 | B-1 | B-2 | B-3 | B-4 |
|---|---|---|---|---|---|---|---|
0   204   374   544   714   918   1088  1258  1428

FIG. 8

| CLOCK | ACLK | | | | |
|---|---|---|---|---|---|
| RESET | ARESETn | | | | |
| CHANNEL NAME | READ ADDRESS CHANNEL | READ DATA CHANNEL | WRITE ADDRESS CHANNEL | WRITE DATA CHANNEL | WRITE RESPONSE CHANNEL |
| HANDSHAKE SIGNAL | ARREADY | RREADY | AWREADY | WREADY | BREADY |
| | ARVALID | RVALID | AWVALID | WVALID | BVALID |
| TRANSFER INFORMATION | ARADDRESS[31:0] | RDATA[31:0] | AWADDRESS[31:0] | WDATA[31:0] | BRESP[1:0] |
| | | RRESP[1:0] | | WSTRB[1:0] | |
| ID | ARID[3:0] | RID[3:0] | AWID[3:0] | WID[3:0] | BID[3:0] |
| TRANSFER ATTRIBUTE | ARBURST[1:0] | RLAST | AWBURST[1:0] | WLAST | |
| | ARLEN[3:0] | | AWLEN[3:0] | | |
| | ARLOCK[1:0] | | AWLOCK[1:0] | | |
| | ARCACHE[3:0] | | AWCACHE[3:0] | | |
| | ARPROT[2:0] | | AWPROT[2:0] | | |
| | ARSIZE[2:0] | | AWSIZE[2:0] | | |
| TRANSFER ATTRIBUTE ADDED IN AXI4 | ARQOS[3:0] | | AWQOS[3:0] | | |
| | ARLEN[7:4] | | AWLEN[7:4] | | |
| | ARREGION[3:0] | | AWREGION[3:0] | | |
| | ARUSER[x:0] | RUSER[x:0] | AWUSER[x:0] | WUSER[x:0] | BUSER[x:0] |

FIG. 9

| | LOCK[1:0] | CACHE[3:0] | PORT[2:0] | SIZE[2:0] | BURST[1:0] | ID[3:0] |
|---|---|---|---|---|---|---|
| COMBINATION 1 | 0 0 | 0 0 0 0 | 0 0 0 | 0 1 1 | 0 0 | 0 0 0 0 |
| COMBINATION 2 | 0 0 | 0 0 0 0 | 0 0 0 | 0 1 1 | 0 1 | 0 0 0 0 |
| COMBINATION 3 | 0 0 | 0 0 0 0 | 0 0 1 | 0 1 1 | 0 1 | 0 0 0 1 |
| COMBINATION 4 | 0 0 | 0 0 0 0 | 0 0 0 | 0 1 1 | 1 0 | 0 1 1 0 |

DATA TRANSFERRING APPARATUS AND DATA TRANSFERRING METHOD

BACKGROUND OF THE INVENTION

Techniques of transferring data using packets are applied to various fields. Transmission Control Protocol/Internet Protocol (TCP/IP) is a technique for transferring packets of data over the Internet. PCI Express® is a technique for transferring packets of data between integrated circuits. NoC (Network-on-Chip) is a technique for transferring packets of data within an integrated circuit. In the techniques for transferring packets of data, various types of data necessary for transferring an address or data can be transferred with a small number of signal lines. For example, in PCI Express®, data can be transferred using only two pairs of differential lines. In addition to the feature of a small number of signal lines, such techniques can increase transfer rates. However, in the packet-based transfer techniques, since various types of information are arranged to be sent in a time domain, the number of cycles necessary for transferring the data is larger than that in non-packet-based transfer techniques. To solve the problem, there have been proposed techniques for minimizing information transfer with an advanced packet structure to reduce the number of cycles necessary for data transfer, and thereby to increase the transfer efficiency. For example, a header compression method by V. Jacobson specified in RFC 1144 (RFC 1144, "Compressing TCP/IP Headers", February 1990) is provided. In the header compression method by V. Jacobson, packets transferred last are compared with packets to be transferred next, and then only the difference information is transferred so that packets can be compressed to improve the transfer efficiency.

SUMMARY

In the known techniques such as the method specified in RFC 1144 by V. Jacobson, only the differences from the contents of the last transfer control are considered. Consequently, if the contents are greatly different from the contents of the last transfer control and slightly different from the contents of the transfer control before the last transfer, the packets are not efficiently compressed, and the transfer efficiency is not significantly improved.

According to an aspect of the present invention, a data transferring apparatus includes a receiving unit configured to receive a transfer request containing attribute information that indicates a type of data transfer, a buffer configured to store a plurality of transfer requests received by the receiving unit, a storing unit configured to associate the attribute information with a first identifier and store the attribute information, and a sending unit configured to preferentially transmit, out of the plurality of transfer requests stored in the buffer, a transfer request containing attribute information that corresponds to the attribute information stored in the storing unit, wherein the sending unit is configured to transmit the first identifier associated with the attribute information that corresponds to the attribute information contained in the transfer request in place of the attribute information of the transfer request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a bus bridge configuration.

FIG. 4 illustrates packet identifiers.

FIG. 6A illustrates the number of cycles necessary for request packet sending according to a known technique. FIG. 6B illustrates the number of cycles necessary for request packet sending according to the first exemplary embodiment.

FIG. 8 illustrates an AXI bus protocol.

FIG. 9 illustrates a table stored in the history storing units.

DESCRIPTION OF THE EMBODIMENTS

Various exemplary embodiments, features, and aspects of the invention will be described in detail below with reference to the drawings.

Figure 7:
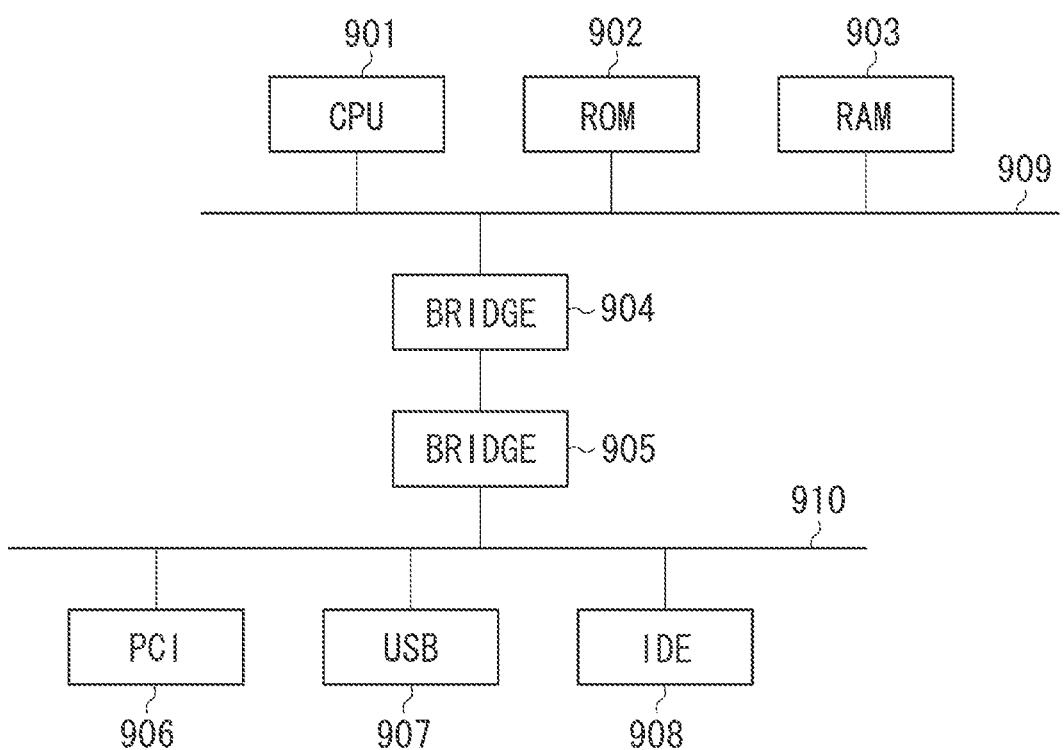
FIG. 7 is a schematic view illustrating an inter-chip communication system configuration.

FIG. 7 illustrates a configuration of an inter-chip communication system including a data transfer apparatus according to a first exemplary embodiment. A central processing unit (CPU) 901, a read-only memory (ROM) 902, and a random access memory (RAM) 903 are connected to a first bus 909. A Peripheral Component Interconnect (PCI) 906, a universal serial bus (USB) 907, and an Integrated Drive Electronics (IDE) 908 are connected to a second bus 910. The first bus 909 and the second bus 910 are connected via a bridge 904 and a bridge 905. This is a typical two-chip set configuration in general-purpose computers. In the configuration, a chip having the bridge 904 and a chip having the bridge 905 are provided.

The CPU 901 loads a program in the ROM 902 into the RAM 903, reads the program from the RAM, and executes the program. The PCI 906, the USB 907, and the IDE 908 connected to the second bus function as a control unit for controlling the connection between various peripherals (not illustrated).

The bridge 904 transfers a data transfer request (read request, write request, or the like), which is transmitted according to a protocol in the first bus 909 by the CPU or a direct memory access controller (DMAC) (not illustrated), to the bridge 905 with inter-chip connection. In a write request transfer, the data transfer request includes the data of the RAM 903 and a value of a register (not illustrated). The bridge 905 transfers data acquired from the bridge 904 to various peripheral circuits according to a protocol in the second bus 910. The data transfer request includes attribute information indicating the type of a data transfer scheme used for transferring target data. The type includes a burst length, an exclusive attribute, security information, and information about whether a cache is used. For example, according to the type of data transfer indicated by the attribute information, data read by read access (upon response) from the CPU or the DMAC (not illustrated) to the PCI 906, the USB 907, and the IDE 908 or data written by write access is transferred.

A response (read data, request completion notification, or the like) to the request is transmitted from the destination of the request to the source of the request. In such a process, the data passes through the bridge 905 and the bridge 904, and reverse conversion of the protocol conversion in the request is performed. The description of the reverse conversion is omitted.

Figure 1:
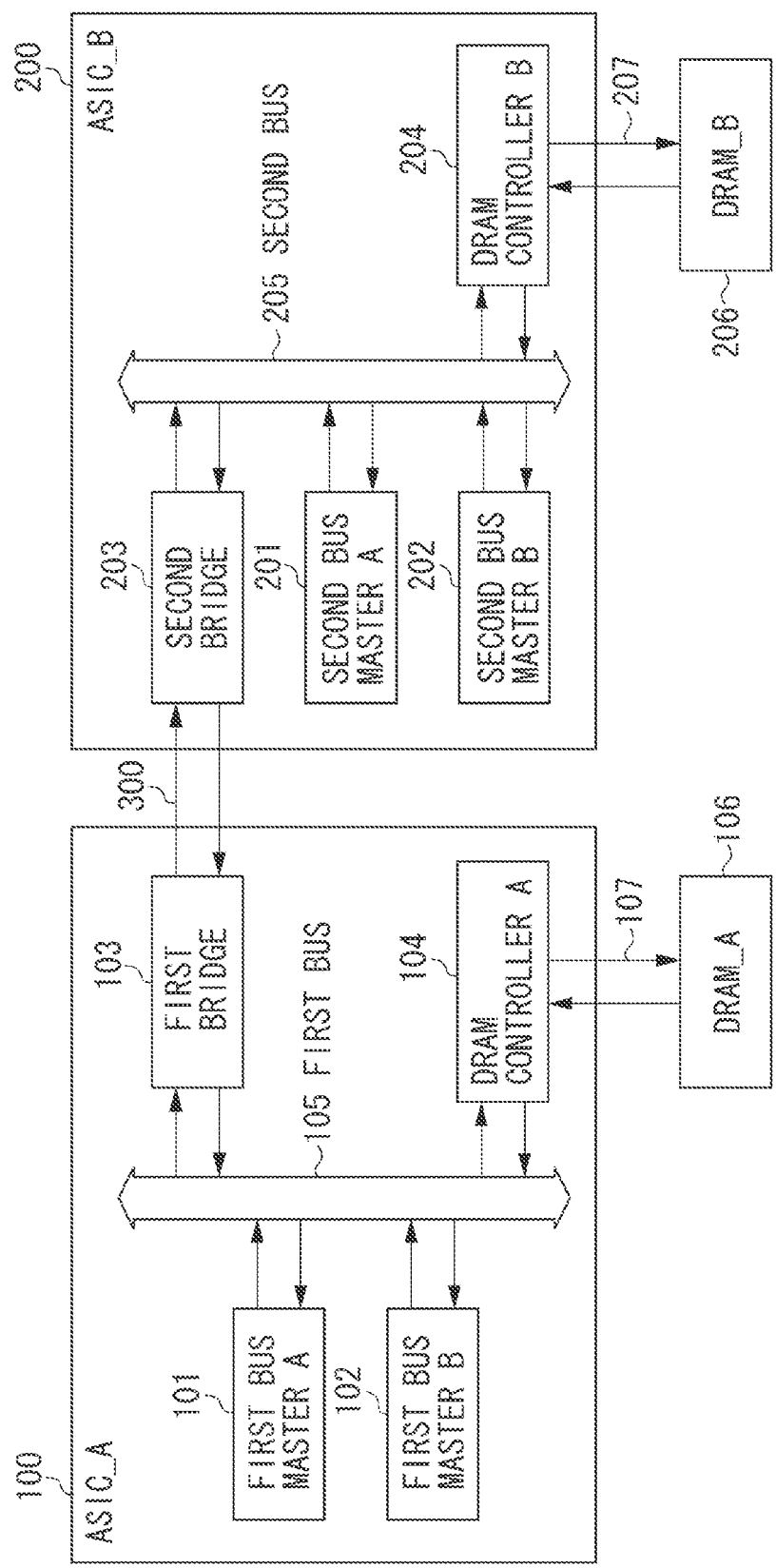
FIG. 1 illustrates a system configuration according to a first exemplary embodiment.

FIG. 1 illustrates a system configuration including an application-specific integrated circuit (ASIC)_A 100 and an ASIC_B 200 connected via a serial bus 300. On the serial bus 300, data transfer is performed using packets. The ASIC_A 100 includes a first bus master A 101, a first bus master B 102, a first bridge 103, and a DRAM controller A 104. The individual modules are connected via a first bus 105. The first bus 105 is a parallel bus to which addresses, data, and the like are connected with individual dedicated lines.

The first bus master A 101 and the first bus master B 102 respectively performs data transfer to and from the first bridge 103 and the DRAM controller A 104 via the first bus 105. The DRAM controller A 104 performs data transfer to and from a DRAM_A 106 via a DRAM interface (I/F) A 107. The first bridge 103 converts the transfer from the first bus 105 into the transfer to the serial bus 300, and performs transfer to a connected second bridge 203 in an ASIC_B 200. The ASIC_B 200 includes a second bus master A 201, a second bus master B 202, a second bridge 203, and a DRAM controller B 204. The individual modules are connected via a second bus 205. The second bus 205 is a parallel bus to which addresses, data, and the like are connected with individual dedicated lines.

The second bridge 203 converts the transfer from the serial bus 300 into a transfer to the second bus, and via the second bus, transfers the data to the DRAM controller B 204. The second bus master A 201 and the second bus master B 202 performs data transfer to and from the DRAM controller B 204 via the second bus 205. The DRAM controller B 204 performs data transfer to and from a DRAM_B 206 via a DRAM_I/F_B 207. The first bus masters A 101 and B 102 and the second bus masters A 201 and B 202 can employ any configuration for outputting a request as a bus master, such as the CPU 901, and the PCI 906, the USB 907, and the IDE 908 for controlling the connection between various peripheries as illustrated in FIG. 7, or a DMAC (not illustrated).

FIG. 2 illustrates a configuration of the first bridge 103 and the second bridge 203 for implementing the transfer method according to the exemplary embodiment. The processes performed in the individual bridges are described below.

First, a sending process of a data transfer request (write request, read request, and the like, and hereinafter, simply referred to as "request") by the first bridge 103 is described. A first bus request receiving unit 1030 receives a request from the first bus master A 101 and the first bus master B 102 via the first bus 105. The request includes an address (Address) of a transfer destination, a flag indicating whether the request is write transfer or read transfer, write data (Wdata), a strobe (Wstrb), and transfer attribute information (ReqAtrb 0/1).

The transfer attribute information (ReqAtrb 0/1) includes information indicating the type of transfer such as a transfer length, a priority of transfer, and the like. A request sending request storing unit (buffer) 1036 can store a plurality of pieces of transfer information (transfer control contents) received via the first bus 105 by the first bus request receiving unit 1030 and not yet converted into a packet by a request packet transforming unit 1031. In the exemplary embodiment, the request sending request storing unit 1036 (and a response request storing unit 2037 described below) includes a FIFO queue (hereinafter, simply referred to as queue), and the unit can identify the order of the reception of the transfer requests by the request packet transforming unit 1031. The transfer information includes, for example, transfer attribute information. In the description below, for the sake of simplicity, transfer attribute information is described as transfer information.

The request packet transforming unit 1031 can acquire transfer information from any stage in a queue, and packetize the transfer information. A request sending history storing unit (storing unit) 1037 stores transfer attribute information (ReqAtrb 0/1) of a last sent packet. The request packet transforming unit 1031 converts the received request into at least one packet.

Figure 3A:
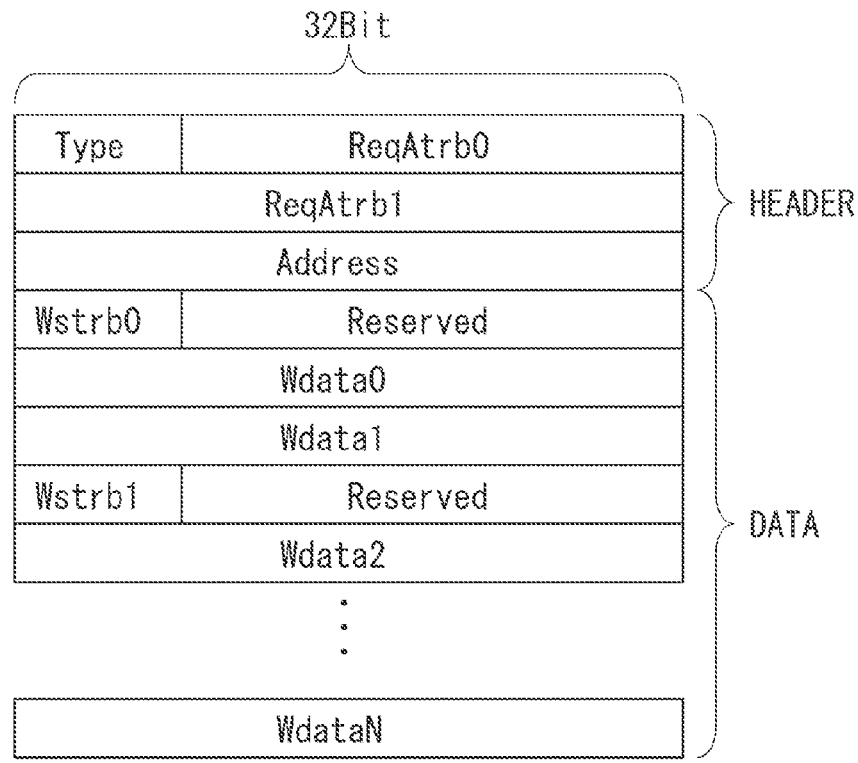
FIG. 3A illustrates a packet converted by the request packet transforming unit, with transfer attribute information added to the packet.
Figure 3B:
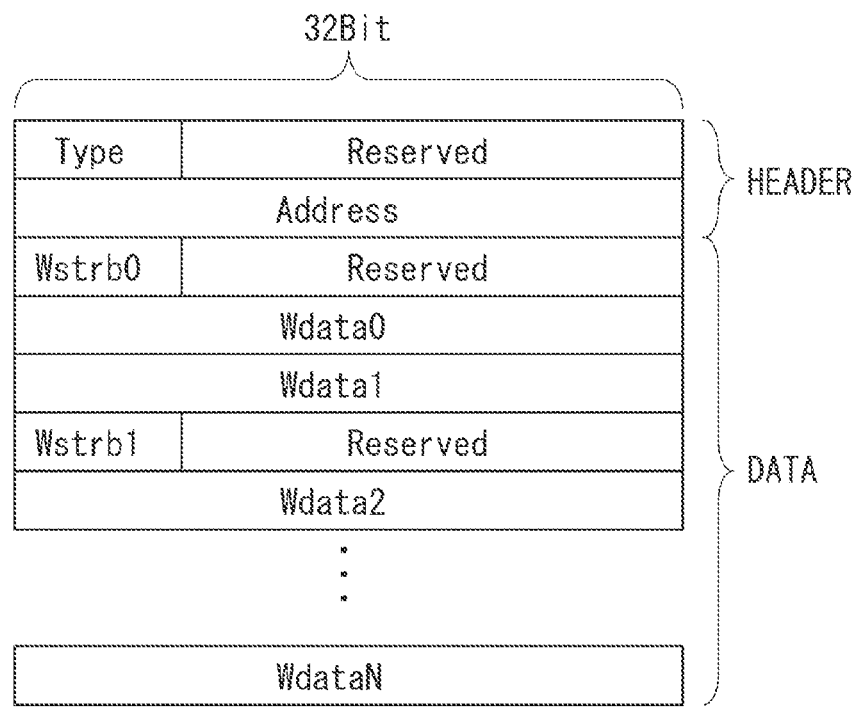
FIG. 3B illustrates a packet converted by the request packet transforming unit, with transfer attribute information not added to the packet.

FIGS. 3A and 3B illustrate the packets converted by the request packet transforming unit 1031. The packet includes a header portion (hereinafter, simply referred to as header) and a data portion (hereinafter, for the sake of simplicity, referred to as data). Technically, the data portion is provided only as a field for storing data, and the data portion may not be data itself. Each of the header and the data includes characters of a predetermined length (32 bits). The header includes an identifier (Type) indicating the type of the packet, transfer attribute information (ReqAtrb 0/1), and an address (Address) of a transfer destination. The data includes write data (Wdata) and a strobe (Wstrb), and is generated in a write transfer.

The packet transforming process in the request packet transforming unit 1031 is described in detail. The request packet transforming unit 1031 converts a request from the first bus into a packet. In the process, the request packet transforming unit 1031 compares the transfer attribute information (ReqAtrb 0/1) of each transfer stored in the request sending request storing unit 1036 with the transfer attribute information (ReqAtrb 0/1) stored in the request sending history storing unit 1037.

As a result of the comparison, if there is no match between the transfer attribute information stored in the request sending request storing unit 1036 and the transfer attribute information (ReqAtrb 0/1) stored in the request sending history storing unit 1037, the request packet transforming unit 1031 converts the transfer request stored in the request sending request storing unit 1036 into a packet in the order of first in, first out (FIFO). In the process, as illustrated in FIG. 3A, the transfer attribute information (ReqAtrb 0/1) is added to the packet. The identifier at this process indicates that the transfer attribute information (ReqAtrb 0/1) is directly added, and if the transfer is a read transfer, the identifier is to be "00000", and if the transfer is a write transfer, the identifier is to be "01000". The first to third bits represent a first identifier indicating that the information corresponds to the request sending history, the fourth bit indicates whether the information is read or write, and the fifth bit represents a second identifier indicating whether the first identifier is added. The request packet transforming unit 1031 updates the transfer attribute information (ReqAtrb 0/1) of the request sending history storing unit 1037.

As a result of the comparison by the request packet transforming unit 1031, if there is a match between the transfer attribute information stored in the request sending request storing unit 1036 and the transfer attribute information (ReqAtrb 0/1) stored in the request sending history storing unit 1037, the request packet transforming unit 1031 converts the transfer information of the earliest received transfer request, out of the corresponding transfer information, into a packet. In the process, as illustrated in FIG. 3B, instead of not adding the transfer attribute information (ReqAtrb 0/1) to the packet, the request packet transforming unit 1031 adds the identifier indicating that the transfer attribute information (ReqAtrb 0/1) is not added. For example, in a case of a read transfer, the identifier is to be "10000", and in a case of a write transfer, the identifier is to be "11000". The request packet transforming unit 1031 according to the exemplary embodiment performs control such that the transfer corresponding to the transfer attribute information (ReqAtrb 0/1) of the last sent packet is preferentially converted into a packet to be transmitted.

In a case where the request sending request storing unit 1036 has two pieces of transfer information, and the comparison with the transfer information received first from the first bus 105 results in a mismatch, and the comparison with the second received transfer information results in a match, the request packet transforming unit 1031 preferentially converts the second received transfer information into a packet. As a result, as compared to the conversion into the packet performed in the order received from the first bus, the number of characters in the packet is smaller by one character. A request packet sending unit 1032 performs parallel-serial conversion of the request converted into the packet and transmits the request to the serial bus 300. It is desirable that the number of bits of the identifier is smaller than the number of bits of the transfer attribute information.

Figure 5:
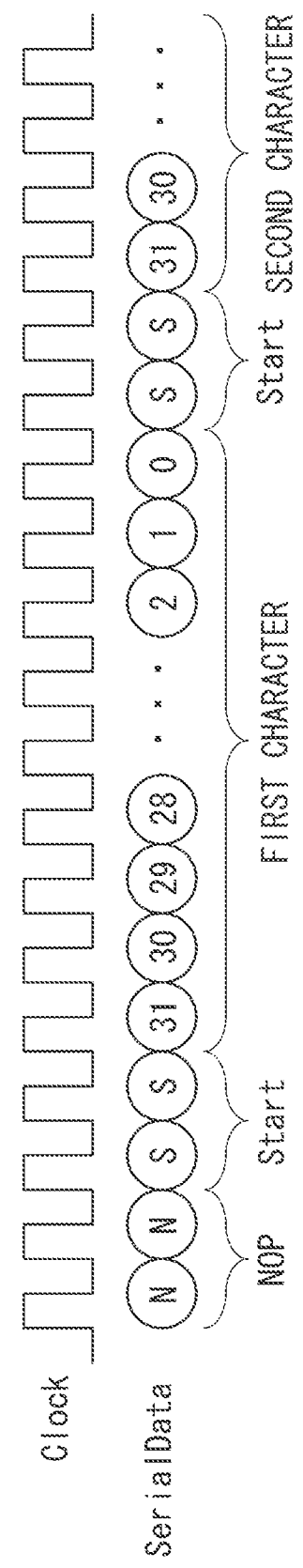
FIG. 5 illustrates a serial bus format.

FIG. 5 illustrates an example of the parallel-serial conversion. In FIG. 5, "N" refers to a non-transfer period, i.e., no operation (NOP), and "S" refers to a start bit. The numbers indicate bit positions in a character. The parallel-serial conversion is performed for each character of the 32-bit unit. A 2-bit start bit indicating the top of the character is added to the character in a 32-bit unit, and the 2-bit start bit is sent. Then, starting from the highest bit of the character in the 32-bit unit, the data is sequentially transmitted by 1 bit. The parallel-serial converted characters are transmitted with the clock to the ASIC_B 200 at the receiving side via the serial bus 300.

The process of receiving the request by the second bridge 203 is described. A request packet receiving unit 2030 receives the character sent from the ASIC_A 100 via the serial bus 300, and performs the serial-parallel conversion of the character. The serial-parallel conversion is performed for each character in the 32-bit unit. First, the request packet receiving unit 2030 performs recognition of the 2-bit start bit. After the recognition of the 2-bit start bit, the request packet receiving unit 2030 receives subsequent 32-bit serial data, converts the serial data into parallel data to form a 32-bit character, and generates a packet with a plurality of 32-bit characters.

A request receiving history storing unit 2036 stores transfer attribute information (ReqAtrb 0/1) of the last received packet. A request packet inverse transforming unit 2031 performs conversion from the packet into a request format for the second bus depending on the identifier (Type) indicating the type of the transfer.

If the identifier of the packet indicates that the transfer attribute information (ReqAtrb 0/1) is added, the request packet inverse transforming unit 2031 extracts the transfer attribute information (ReqAtrb 0/1) from the received packet, and converts the packet into a request format for the second bus. The request packet inverse transforming unit 2031 stores the extracted transfer attribute information (ReqAtrb 0/1) in the request receiving history storing unit 2036.

If the identifier indicating the type of the packet indicates that the transfer attribute information (ReqAtrb 0/1) is not added, the request packet inverse transforming unit 2031 refers to the transfer attribute information (ReqAtrb 0/1) of the last received packet, and converts the packet into a request format for the second bus. A second bus request sending unit 2032 transmits the request converted into the request form for the second bus to a DRAM controller B 204 via a second bus 205.

The process of sending the response by the second bridge 203 is described. A second bus response receiving unit 2033 receives the response from the DRAM controller B 204 via the second bus 205. The response includes status information (RespSt) indicating whether an error or not, read data (Rdata), and transfer attribute information (RespAtrb 0/1) indicating the transfer length and the priority of the transfer.

A response sending request storing unit 2037 can store at least two transfers that are received via the second bus by the second bus response receiving unit 2033 and not yet converted into a packet by a response packet transforming unit 2034. A response sending history storing unit 2038 stores the transfer attribute information (RespAtrb 0/1) of the last sent packet. The response packet transforming unit 2034 converts a response from the second bus 205 into a packet. In the process, the response packet transforming unit 2034 compares the transfer attribute information (RespAtrb 0/1) of each transfer stored in the response sending request storing unit 2037 with the transfer attribute information (RespAtrb 0/1) of the last sent packet stored in the response sending history storing unit 2038.

Figure 3C:
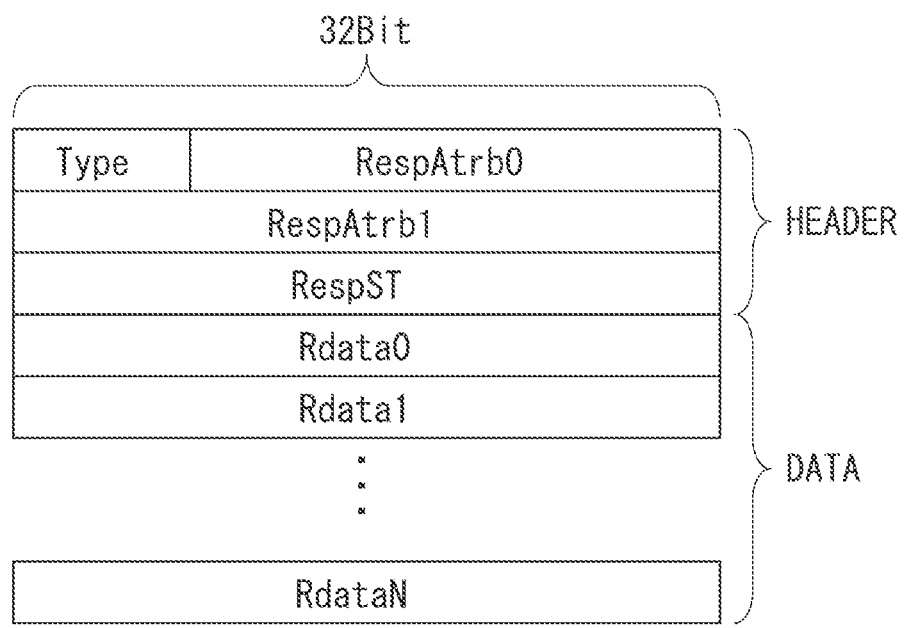
FIG. 3C illustrates a packet converted by the response packet transforming unit, with transfer attribute information added to the packet.

As a result of the comparison, if there is no transfer attribute information that corresponds to the transfer attribute information (RespAtrb 0/1) of the last sent packet, the response packet transforming unit 2034 converts the oldest transfer stored in the response sending request storing unit 2037 into a packet. In the process, as illustrated in FIG. 3C, the transfer attribute information (RespAtrb 0/1) is added to the packet. The identifier at this process indicates that the transfer attribute information (RespAtrb 0/1) is added, and if the transfer is a read transfer, the identifier is to be "00100", and if the transfer is a write transfer, the identifier is to be "01100". The response packet transforming unit 2034 updates the transfer attribute information (RespAtrb 0/1) of the response sending history storing unit 2038.

Figure 3D:
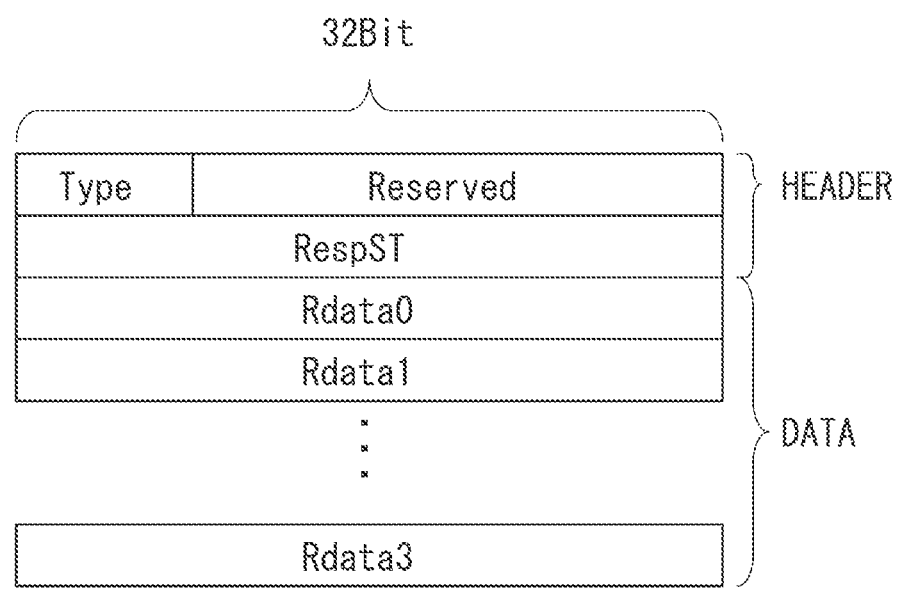
FIG. 3D illustrates a packet converted by the response packet transforming unit, with transfer attribute information not added to the packet.

On the other hand, if there is transfer attribute information that corresponds to the transfer attribute information (RespAtrb 0/1) of the last sent packet in the response sending request storing unit, the response packet transforming unit 2034 converts the oldest transfer out of the corresponding transfer requests. In the process, as illustrated in FIG. 3D, instead of not adding the transfer attribute information (RespAtrb 0/1) to the packet, the response packet transforming unit 2034 adds the identifier indicating that the transfer attribute information (RespAtrb 0/1) is not added. For example, in a case of a read transfer, the identifier is to be "10100", and in a case of a write transfer, the identifier is to be "11100". The response packet transforming unit 2034 according to the exemplary embodiment preferentially converts the transfer corresponding to the transfer attribute information (ReqAtrb 0/1) of the last sent packet into a packet.

In a case where the response sending request storing unit 2037 has two pieces of transfer information, and the comparison with the transfer information received first from the second bus 205 results in a mismatch, and the comparison with the second received transfer information result in a match, the response packet transforming unit 2034 preferentially converts the second received transfer information into a packet. As a result, as compared to the conversion into the packet performed in the order received from the second bus 205, the number of characters in the packet is smaller by one character. A response packet sending unit 2035 performs parallel-serial conversion of the response converted into the packet and transmits the response to the serial bus 300. The operation in the parallel-serial conversion is similar to that in the request packet sending unit 1032, and the description of the operation is omitted. The parallel-serial converted characters are sent with the clock to the ASIC_A 100 via the serial bus 300.

The process of receiving the response by the first bridge 103 is described. A response packet receiving unit 1033 receives the character sent from the ASIC_B 200 via the serial bus 300, and performs serial-parallel conversion of the character. The operation in the serial-parallel conversion is similar to that in the request packet receiving unit 2030, and the description of the operation is omitted.

A response receiving history storing unit 1038 stores transfer attribute information (RespAtrb 0/1) of the last received packet. A response packet inverse transforming unit 1034 performs conversion from the packet into a response format for the first bus 105 depending on the identifier (Type) indicating the type of the transfer. If the identifier indicating the type of the packet indicates the packet including the added transfer attribute information (RespAtrb 0/1), the response packet inverse transforming unit 1034 extracts the transfer attribute information (RespAtrb 0/1) from the received packet, and converts the packet into the response format for the first bus 105. The response packet inverse transforming unit 1034 stores the extracted transfer attribute information (RespAtrb 0/1) in a response receiving history storing unit 1038. If the identifier indicating the type of the packet indicates the packet not including the transfer attribute information (RespAtrb 0/1), the response packet inverse transforming unit 1034 refers to the transfer attribute information (RespAtrb 0/1) of the last received packet, and converts the packet into the response format for the first bus 105. A first bus response sending unit 1035 transmits the response converted into the response format for the first bus 105 to the master that issued the corresponding request via the first bus 105.

FIG. 8 illustrates control signals in the Advanced extensible Interface (AXI) bus, which is a protocol for a bus used in an integrated circuit, and addresses, data, and attribute information.

The AXI bus protocol has five transfer paths called channels. Specifically, the channels are a read address channel for sending a read address, a write address channel for sending a write address, a read data channel for sending a read response and data, a write data channel for sending write data, and a write response channel for sending a write response. The individual channels perform a handshake with a valid signal and a ready signal for controlling transmission of a transfer and timing, and performs a series of transfer processes. In addition to the addresses and data that are the basic information in the data transfer, transfer attribute information is specified in the individual channels. The transfer attribute information includes xBURST indicating a transfer type, xLEN indicating a transfer length, xLOC indicating an atomic transfer, xCACHE indicating control information of a cache, xPROT indicating transfer security information, xSIZE indicating a size of transfer data width, xQOS indicating transfer priority, xBURST indicating a transfer area section, and an xUSER signal for transferring information intended by a user.

FIG. 9 illustrates a table of the transfer information (attribute information) stored in the sending history storing units (1037 and 2038), and the receiving history storing units (2036 and 1038). In the example in FIG. 9, the table stores the four combinations, however, as described above, the history storing units according to the exemplary embodiment may store at least one combination of the attribute information.

For example, when the packet transforming units (1031 and 2034) receives a transfer request from the sending request storing unit (1036 or 2037) and requests packet transformation, the packet transforming unit (1031 or 2034) adds the attribute information in the sending history storing unit (1037 or 2038) each time attribute information not stored in the sending history storing unit (1037 or 2038) is converted. This can prevent the same attribute information from being stored redundantly, thereby increasing efficiency. If the user adds new attribute information in the state the four combinations are stored, the oldest information can be erased. The response sending request storing unit 2037, the response packet transforming unit 2034, and the response sending history storing unit 2038 at the response side operate similarly, and accordingly, the description of the units is omitted. The process for maintaining consistency of the tables stored in the individual history storing units can be omitted if the algorism for adding the attribute information to the table in the request packet inverse transforming unit 2031 and the algorism in the request packet transforming unit 1031 are standardized.

The attribute information of the first bus (AXI) and the second bus (AXI) includes an exclusive control attribute (LOCK), a cache attribute (CACHE), a security attribute (PORT), a data size (SIZE), a request type (BURST), and a source (ID).

The exclusive control attribute (LOCK) indicates whether the procedure for exclusively using the system bus at the receiving apparatus side is completed and the transfer is to be executed. As an exclusive control attribute (LOCK) signal, one bit each is assigned to express a "Lock" bit indicating whether a transfer for performing a bus lock is to be executed, and an "Exclusive" bit indicating whether an exclusive transfer for increasing the system performance is to be performed.

The cache attribute indicates whether the receiving apparatus permits buffering of the transfer content in the path to the transfer destination of the data. Four bits are assigned to the cache attribute. The bits includes a bit indicating whether caching can be executed, a bit indicating whether buffering can be executed, and a field (two bits) issuing an instruction such as write-through or write-back to the cache system itself when cache mishit occurs.

The security attribute indicates whether the procedure for receiving the data in a slave having a high security level is completed and the transfer is to be executed.

The request type (BURST) indicates the type of the transfer. The request type expresses three pieces of information of INCR (sequential address transfer), FIXED (address fixation), and WARP (addressing in a case of occurrence of a cache mishit) by encoding the information in two bits.

The data size indicates that the data transfer is performed in the unit indicated by the data size. For example, in a case of the physical data width of 128 bits, the data size indicates which data width unit of 8 bits, 16 bits, . . . , 128 bits is used for the transfer. For the sake of simplicity, in the description, the sending history storing units include the tables. However, any format containing similar information other than the table format can be used.

As described above, according to the exemplary embodiment, in generating a request packet, the first bridge 103 (or the second bridge 203) preferentially converts a transfer that corresponds to transfer attribute information of a sent packet stored in the history storing unit 1037 (or 2038) into a packet, out of transfer attribute information (ReqAtrb 0/1) stored in the sending request storing unit 1036 (or the response sending request storing unit 2037), and transmits the packet. If there is a corresponding transfer, the first bridge 103 (or the second bridge 203) does not add the transfer attribute information (ReqAtrb 0/1) to the packet, thereby reducing the number of characters necessary for the transfer. Thus, if the transfer attribute information in the last received transfer does not correspond to the transfer attribute information (ReqAtrb 0/1) but if the transfer attribute information corresponds to a second last transfer or a transfer before the second last transfer, effective compression of the information can be achieved and the transfer efficiency can be improved.

FIG. 6A illustrates the number of cycles necessary for request packet sending according to a known technology. FIG. 6B illustrates the number of cycles necessary for request packet sending according to the exemplary embodiment. The numbers in FIGS. 6A and 6B indicate the number of cycles necessary for the transfer. In the example in FIG. 6A, the requests (A-1 to A4) from the first bus master A 101 and the requests (B-1 to B-4) from the first bus master B 102 are alternately sent to the first bridge 103. It is assumed that the all transfers are 64-bit single-write transfers. In this example, the transfer attribute information (ReqAtrb 0/1) issued from the first bus master A 101 differs from the transfer attribute information (ReqAtrb 0/1) issued from the first bus master B 102. In the example in FIG. 6A, the reduction of the characters is not performed in the packet generation. All packets from the individual masters respectively include the total of six characters consisting of a header of three characters and data of three characters. Consequently, in performing four write transfers from each master, 6 (the number of characters)*4 (the number of transfers in each master)*2 (the number of masters)=48 characters are necessary. A transfer of each character requires 34 cycles, and consequently, the transfer in the known technique requires 48*34=1632 cycles. In the exemplary embodiment, the character reduction is performed in the packet generation from each master after the second transfer. As a result, the number of characters in the transfers after the second transfer from each master can be reduced to five, as compared to the number of characters of six of the packets to which the character reduction is not performed. Consequently, the number of characters required to perform the four write transfers from each master is to be as follows: 6 (the number of characters in the first transfer)*2 (the number of masters)+5 (the number of characters in and after the second transfer)*3 (the total number of transfers from each master −1)*2 (the number of masters)=42 characters. The transfer of each character requires 34 cycles, and consequently, in the transfer according to the exemplary embodiment, 42*34=1428 cycles are required. In the known technique, the same transfer requires 1632 cycles. Thus, the exemplary embodiment can reduce the number of cycles of 204 necessary for the transfer as compared to the known technology.

In the above-described exemplary embodiment, in the request sending request storing unit 1036 and the response sending request storing unit 2037, the number of queue stages is two. However, three or more queue stages can be provided.

In the above-described exemplary embodiment, the data transfer performed between the integrated circuits (inter-chip or inter-module transfer) is described. However, the exemplary embodiment can be applied to data transfer within the same integrated circuit (intra-chip or intra-module transfer).

As compared to the intra-chip transfer, the data transfer performance is low in the inter-chip transfer, and this can be a bottleneck in the system. In the intra-chip transfer, a physical signal line is provided for each of the "attribute information", "address", and "data", and the data can be simultaneously transferred in parallel. On the other hand, in the inter-chip transfer, a signal line needs to be shared in order to reduce costs of the product, since the IO pins in the chip causes cost increase, and the data is time-sequentially transferred. Consequently, the increase in the transfer efficiency according to the exemplary embodiment is significant in the inter-chip transfer as compared to the intra-chip transfer.

Further, if it is known in advance that the address has a portion that does not change in a high or low portion of the address, the high (or low) address information can be included in the attribute information table, and the attribute information and the portion (high or low bits) of the address that does not change can be compressed together. For example, in view of the properties of the address map of software and a bus specification, when a module is accessed, the high four bits can be always fixed to "0000". In such a case, a high address comparison value is input in the table to further increase the data transfer efficiency for the number of bits of the address that does not change. This can be applied to the case of the low address. In such a case, if the address portion that does not change is replaced with an identifier, whether the combination of the attribute information corresponds with each other can be simply checked and the replacement can be performed.

In the above-described exemplary embodiment, if a combination of attribute information does not correspond to stored information, an identifier indicating that the information does not correspond with each other is simply added. Alternatively, if the combination of the attribute information does not correspond with each other, replacement of the address portion that does not change can be performed. In such a case, at the decoding side, a configuration for always adding an address portion that does not change can be provided.

In the above-described exemplary embodiment, the AXI is described as the bus protocol. The exemplary embodiment can be widely and effectively applied to any protocol for combining data, an address, and attribute information and transferring the information. The exemplary embodiment can also be applied to any configuration expressing a plurality of transfer contents as one piece of attribute information with a plurality of numbers of bits.

The embodiment can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-278698 filed Dec. 20, 2011, which is hereby incorporated by reference herein in its entirety.

What is claimed is:
1. A data transferring apparatus comprising:
a receiving unit configured to receive a transfer request containing attribute information, the attribute information indicating a type of data transfer;
a buffer configured to store a plurality of transfer requests received by the receiving unit;

a sending unit configured to send the plurality of transfer requests; and a storing unit configured to associate the attribute information of a sent transfer request with a first identifier and store the attribute information, wherein the sending unit is configured to select, out of the plurality of transfer requests stored in the buffer, next at least one transfer request containing attribute information that corresponds to the attribute information stored in the storing unit and preferentially send the selected at least one transfer request with the first identifier in place of the attribute information of the selected at least one transfer request, the preferential sending performed by changing an order of sending transfer requests so that transfer requests containing same attribute information are consecutively sent, wherein the sending unit is configured to preferentially send an older one of the following two transfer requests before sending the other transfer request:

(a) an oldest transfer request stored in the buffer among transfer requests containing first attribute information, and (b) an oldest transfer request stored in the buffer among transfer requests containing second attribute information.

2. The data transferring apparatus according to claim 1, wherein the sending unit is configured to add, to the transfer request, a second identifier indicating that the first identifier is not included in the transfer request, and to transmit the transfer request if there is no transfer request among the stored transfer requests containing attribute information that corresponds to the attribute information stored in the storing unit.

3. The data transferring apparatus according to claim 1, wherein, in a case where the sending unit transmits the transfer request without including the first identifier, the sending unit is configured to store the attribute information contained in the transfer request in the storage unit.

4. A data transferring apparatus configured to transfer data using a packet including a header portion and a data portion, the data transferring apparatus comprising:

a storing unit configured to store attribute information of a sent transfer request;

a receiving unit configured to receive a transfer request containing attribute information, the attribute information indicating a type of data transfer, and to store a plurality of the transfer requests; and a sending unit configured to send the plurality of transfer requests, wherein the sending unit is configured to, in a case where the attribute information in a transfer request stored in the receiving unit corresponds to the attribute information stored in the storing unit, include, in a packet containing the transfer request, an identifier indicating correspondence of the attribute information in place of the attribute information of the transfer request, and to preferentially transmit the packet, the preferential transmission performed by changing an order of sending packets so that transfer requests containing same attribute information are consecutively sent, wherein the sending unit is configured to preferentially send an older one of the following two transfer requests before sending the other transfer request:

(a) an oldest transfer request stored in the buffer among transfer requests containing first attribute information, and (b) an oldest transfer request stored in the buffer among transfer requests containing second attribute information.

5. The data transferring apparatus according to claim 4, wherein the sending unit is configured to, in a case where the attribute information in the transfer request stored in the receiving unit does not correspond to the attribute information stored in the storing unit, include, in a packet containing the transfer request, an identifier indicating non-correspondence of the attribute information together with the attribute information of the transfer request and to transmit the packet.

6. The data transferring apparatus according to claim 4, wherein the receiving unit is configured to receive the transfer request via a first bus, and wherein the sending unit is configured to convert the attribute information of the transfer request into attribute information complying with a format of a second bus and to transmit the packet.

7. A method for transferring data by a data transferring apparatus, the data transferring apparatus including a receiving unit configured to receive a transfer request containing attribute information, the attribute information indicating a type of data transfer, a buffer configured to store a plurality of transfer requests received by the receiving unit, a sending unit configured to send the plurality of transfer requests, and a storing unit configured to associate the attribute information of a sent transfer request with a first identifier, and to store the attribute information, the method comprising:

from the plurality of transfer requests stored in the buffer, selecting next the at least one transfer request containing attribute information that corresponds to the attribute information stored in the storing unit, including the first identifier in place of the attribute information of the selected at least one transfer request, and preferentially transmitting the selected at least one transfer request, the preferential sending performed by changing an order of sending transfer requests so that transfer requests containing same attribute information are consecutively sent, wherein the sending unit is configured to preferentially send an older one of the following two transfer requests before sending the other transfer request:

(a) an oldest transfer request stored in the buffer among transfer requests containing first attribute information, and (b) an oldest transfer request stored in the buffer among transfer requests containing second attribute information.

8. A method for transferring data by a data transferring apparatus using a packet including a header portion and a data portion, the data transferring apparatus including a storing unit configured to store attribute information of a sent transfer request, a receiving unit configured to receive a transfer request containing the attribute information, the attribute information indicating a type of data transfer, and to store a plurality of the transfer requests, and a sending unit configured to send the plurality of transfer requests, the method comprising:

in a case where the attribute information in a transfer request stored in the receiving unit corresponds to the attribute information stored in the storing unit, including, in a packet containing the transfer request, an identifier that indicates correspondence of the attribute information in place of the attribute information of the transfer request, and preferentially transmitting the packet, the preferential transmission performed by changing an order of sending packets so that transfer requests containing same attribute information are consecutively sent, wherein the sending unit is configured to preferentially send an older one of the following two transfer requests before sending the other transfer request:

(a) an oldest transfer request stored in the buffer among transfer requests containing first attribute information, and (b) an oldest transfer request stored in the buffer among transfer requests containing second attribute information.

* * * * *